US011233537B2

(12) United States Patent
Zhu et al.

(10) Patent No.: US 11,233,537 B2
(45) Date of Patent: Jan. 25, 2022

(54) WIDE-BAND ANTENNA MULTIPLEXING METHOD AND DEVICE OF UNMANNED AERIAL VEHICLE

(71) Applicant: Goertek Inc., Weifang (CN)

(72) Inventors: Jian Zhu, Weifang (CN); Xiangdong Zhang, Weifang (CN); Zhenyu Yu, Weifang (CN); Zhiping Luo, Weifang (CN); Dong Yan, Weifang (CN)

(73) Assignee: Goertek Inc., Weifang (CN)

( * ) Notice: Subject to any disclaimer, the term of this patent is extended or adjusted under 35 U.S.C. 154(b) by 628 days.

(21) Appl. No.: 16/097,873

(22) PCT Filed: Jun. 8, 2018

(86) PCT No.: PCT/CN2018/090405
§ 371 (c)(1),
(2) Date: Oct. 31, 2018

(87) PCT Pub. No.: WO2019/062201
PCT Pub. Date: Apr. 4, 2019

(65) Prior Publication Data
US 2021/0258033 A1 Aug. 19, 2021

(30) Foreign Application Priority Data
Sep. 28, 2017 (CN) .......................... 201710898774.4

(51) Int. Cl.
*H04B 1/40* (2015.01)
*H01Q 1/28* (2006.01)
(52) U.S. Cl.
CPC ................. *H04B 1/40* (2013.01); *H01Q 1/28* (2013.01)
(58) Field of Classification Search
CPC .... G08G 5/045; G08G 5/0069; G08G 5/0078; G08G 5/006; G08G 5/0082;
(Continued)

(56) References Cited

U.S. PATENT DOCUMENTS 5,323,127 A * 6/1994 Komazaki ................ H03H 7/46
                                                    333/126
5,715,527 A * 2/1998 Horii ..................... H03G 3/3042
                                                    455/126
(Continued)

FOREIGN PATENT DOCUMENTS

CN      102064845 A    5/2011
CN      102809751 A    12/2012
(Continued)

OTHER PUBLICATIONS

International Bureau of WIPO, International Search Report and Written Opinion in Application No. PCT/CN2018/090405 dated Aug. 17, 2018.

*Primary Examiner* — James M Perez
(74) *Attorney, Agent, or Firm* — LKGlobal | Lorenz & Kopf, LLP

(57) ABSTRACT

A wide-band antenna multiplexing method and device of an unmanned aerial vehicle (UAV) are disclosed. The method comprises: by a wide-band antenna, receiving an external signal and sending the received external signal to a first power divider; by the first power divider, dividing the external signal received from the wide-band antenna into multi-way sub-signals, and sending each sub-signal respectively to a receiving filter of a plurality of receiving filters, each of which is connected to the first power divider and corresponds to a functional modules of the UAV respectively; and by each respective receiving filter, performing filtering processing on the received sub-signal, obtaining a signal corresponding to the working frequency band of each respective functional module of the UAV, and sending the signal corresponding to the working frequency band of each respective functional module of the UAV to a corresponding functional module.

14 Claims, 2 Drawing Sheets

(58) Field of Classification Search
CPC ...... G08G 5/0034; G08G 5/04; G08G 5/0043; H04B 1/005; H04B 1/0053; H04B 1/0057; H04B 1/38; H04B 1/40; H01Q 1/27; H01Q 1/28

See application file for complete search history.

(56) References Cited

U.S. PATENT DOCUMENTS

| | | | | |
|---|---|---|---|---|
| 6,222,426 | B1* | 4/2001 | Komazaki | H03H 9/0576 333/133 |
| 8,761,603 | B1* | 6/2014 | Maleki | G01S 13/86 398/129 |
| 9,608,692 | B2* | 3/2017 | Bennett | H04W 88/08 |
| 9,693,250 | B1* | 6/2017 | Hou | H04W 24/08 |
| 9,906,318 | B2* | 2/2018 | Zuo | H03H 7/465 |
| 9,999,038 | B2* | 6/2018 | Barzegar | H04B 7/15542 |
| 10,144,036 | B2* | 12/2018 | Fuchs | H04B 3/54 |
| 10,327,213 | B1* | 6/2019 | Han | H04W 52/367 |
| 10,528,023 | B2* | 1/2020 | Steinbach | G05B 19/182 |
| 10,540,905 | B2* | 1/2020 | Bohanan | G08G 5/0021 |
| 10,674,090 | B2* | 6/2020 | Liu | H04N 5/23299 |
| 10,718,617 | B2* | 7/2020 | Wang | G01C 25/005 |
| 10,811,767 | B2* | 10/2020 | Henry | H01Q 1/36 |
| 10,852,445 | B2* | 12/2020 | Zhu | G01S 19/42 |
| 11,067,977 | B2* | 7/2021 | Su | G05D 1/0016 |
| 11,115,975 | B2* | 9/2021 | Kosarev | H04B 1/7097 |
| 2001/0052830 | A1* | 12/2001 | Noguchi | H03H 9/6483 333/133 |
| 2002/0089396 | A1* | 7/2002 | Noguchi | H03H 9/6483 333/193 |
| 2002/0171507 | A1* | 11/2002 | Ohashi | H03H 7/38 333/133 |
| 2003/0112094 | A1* | 6/2003 | Ehara | H03H 9/0576 333/133 |
| 2008/0018545 | A1* | 1/2008 | Kaplan | H01Q 1/3275 343/713 |
| 2011/0215985 | A1* | 9/2011 | Kaplan | H01Q 21/08 343/879 |
| 2013/0201050 | A1* | 8/2013 | Hellsten | G01S 13/32 342/21 |
| 2014/0266886 | A1* | 9/2014 | Wang | G01S 19/37 342/357.73 |
| 2015/0102953 | A1* | 4/2015 | Stayton | H04B 1/3822 342/47 |
| 2015/0304059 | A1* | 10/2015 | Zuo | H04B 1/0057 370/343 |
| 2016/0329916 | A1* | 11/2016 | Stambovsky | H01Q 21/065 |
| 2017/0301248 | A1* | 10/2017 | Silverman | G08G 5/045 |
| 2018/0267144 | A1* | 9/2018 | Lin | G01S 13/10 |
| 2018/0319495 | A1* | 11/2018 | Tu | H04W 4/029 |
| 2019/0009926 | A1* | 1/2019 | Hu | B64F 1/02 |
| 2019/0056725 | A1* | 2/2019 | Su | B64C 39/024 |
| 2019/0154439 | A1* | 5/2019 | Binder | G01S 15/08 |
| 2019/0208112 | A1* | 7/2019 | Kleinbeck | G01S 5/0257 |
| 2019/0385057 | A1* | 12/2019 | Litichever | G06N 3/08 |
| 2020/0044729 | A1* | 2/2020 | Malaga | G07C 5/008 |
| 2020/0153410 | A1* | 5/2020 | Nielsen | H03H 9/542 |
| 2020/0257003 | A1* | 8/2020 | Zhu | G08G 5/0013 |
| 2020/0267753 | A1* | 8/2020 | Adjakple | H04W 72/1226 |
| 2020/0278700 | A1* | 9/2020 | Lin | G05D 1/0816 |
| 2020/0288412 | A1* | 9/2020 | Ajdakple | H04L 5/0092 |
| 2020/0393545 | A1* | 12/2020 | Shani | G01S 17/89 |
| 2020/0413387 | A1* | 12/2020 | Kosarev | H04W 72/005 |
| 2021/0067186 | A1* | 3/2021 | Beaudin | H04B 1/005 |

FOREIGN PATENT DOCUMENTS

| | | |
|---|---|---|
| CN | 203434938 U | 2/2014 |
| CN | 205017319 U | 2/2016 |
| CN | 107565989 A | 1/2018 |
| CN | 207427127 U | 5/2018 |
| JP | 2006211057 A | 8/2006 |

\* cited by examiner

WIDE-BAND ANTENNA MULTIPLEXING METHOD AND DEVICE OF UNMANNED AERIAL VEHICLE

CROSS REFERENCE TO RELATED APPLICATIONS

This application is a U.S. National Stage entry under 35 U.S.C. § 371 based on International Application No. PCT/CN2018/090405, filed on Jun. 8, 2018, which was published under PCT Article 21(2) and which claims priority to Chinese Patent Application No. 201710898774.4, filed on Sep. 28, 2017 which are all hereby incorporated herein by reference in their entirety.

TECHNICAL FIELD

This Application pertains to the technical field of unmanned aerial vehicles (UAVs), and more particularly to a wide-band antenna multiplexing method and device of an unmanned aerial vehicle (UAV).

BACKGROUND

A pilotless aircraft, also referred to as an unmanned aerial vehicle (UAV), is an unmanned aircraft operated by a control device, and is commonly used in aerial photography, geographic mapping, real-time monitoring of traffic, inspection of power supply lines, and spraying of pesticides.

With the development of UAV technology, more and more electronic devices are added to UAVs. On the one hand, the new electronic devices added to UAVs improve the performance of UAVs, and on the other hand, they increase the power consumption and reduce the flight endurance of UAVs. The flight endurance of a UAV is related to the weight of the UAV; the larger the weight is, the shorter the flight endurance is. At present, the flight endurance of the commercial UAVs in the market is typically less than 30 minutes.

A UAV communicates with the outside by an antenna. The conventional UAVs are only provided with an antenna for receiving a remote control signal and an antenna for receiving a Global Positioning System (GPS) signal. In the prior art, in order to improve the performance of the UAV, more antennas are provided. However, these antennas increase the weight of the UAVs and reduce the flight endurance of the UAVs, which restricts the market expansion of UAVs to a certain extent. In addition, other objects, desirable features and characteristics will become apparent from the subsequent summary and detailed description, and the appended claims, taken in conjunction with the accompanying drawings and this background.

SUMMARY

In order to solve the problems of the existing UAVs that the antennas are heavy and the flight endurance is short, the present disclosure provides a wide-band antenna multiplexing method and device of a UAV.

An embodiment of the present disclosure provides a wide-band antenna multiplexing method of UAV, wherein the UAV is provided with a wide-band antenna, and the method comprises:

by the wide-band antenna, receiving an external signal and sending the received external signal to a first power divider;

by the first power divider, dividing the external signal received from the wide-band antenna into multi-way sub-signals, and sending each sub-signal respectively to a receiving filter of a plurality of receiving filters, each of which is connected to the first power divider and corresponds to a functional module of the UAV respectively, wherein the quantity of the sub-signals is determined according to the working frequency bands of the functional modules of the UAV; and by each respective receiving filter, performing filtering processing on the received sub-signal, obtaining a signal corresponding to the working frequency band of each respective functional module of the UAV, and sending the signal corresponding to the working frequency band of each respective functional module of the UAV to a corresponding functional module.

Another embodiment of the present disclosure provides a wide-band antenna multiplexing device of a UAV, comprising: a wide-band antenna, a first power divider and a plurality of receiving filters;

the wide-band antenna is configured to receive an external signal and send the received external signal to the first power divider;

the first power divider is configured to divide the external signal received from the wide-band antenna into multi-way sub-signals, and send each sub-signal respectively to a receiving filter of the plurality of receiving filters, each of which is connected to the first power divider and corresponds to a functional module of the UAV respectively, wherein the quantity of the sub-signals is determined according to the working frequency bands of the functional modules of the UAV; and each respective receiving filter is configured to perform filtering processing on the received sub-signal, obtain a signal corresponding to the working frequency band of each respective functional module of the UAV, and send the signal corresponding to the working frequency band of each respective functional module of the UAV to a corresponding functional module.

The advantageous effects of the embodiments of the present disclosure are as follows. According to the present disclosure, a wide-band antenna is provided on the UAV, all external signals are received through the wide-band antenna, the first power divider divides the received external signal into multi-way sub-signals and sends each respective sub-signal respectively to each respective receiving filter corresponding to each respective functional module on the UAV, each respective receiving filter performs filtering processing on the received sub-signal to obtain a signal corresponding to the working frequency band of each respective functional module of the UAV, and the signal is sent to the corresponding functional module and is used by each respective functional module. Unlike the prior art, the present disclosure uses a wide-band antenna in place of the conventional multiple antennas to receive all external signals, and sends various signals needed by the UAV to corresponding functional modules through the processing of the first power divider and a plurality of receiving filters, which greatly reduces the weight of the UAV and improves the flight endurance of the UAV.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the Application and uses of the invention. Furthermore, there is no intention to be bound by any theory presented in the preceding background of the invention or the following detailed description.

To make the objectives, technical solutions and advantages of the present disclosure clearer, the embodiments of the present disclosure will be further described in detail with reference to the accompanying drawings.

Figure 1:
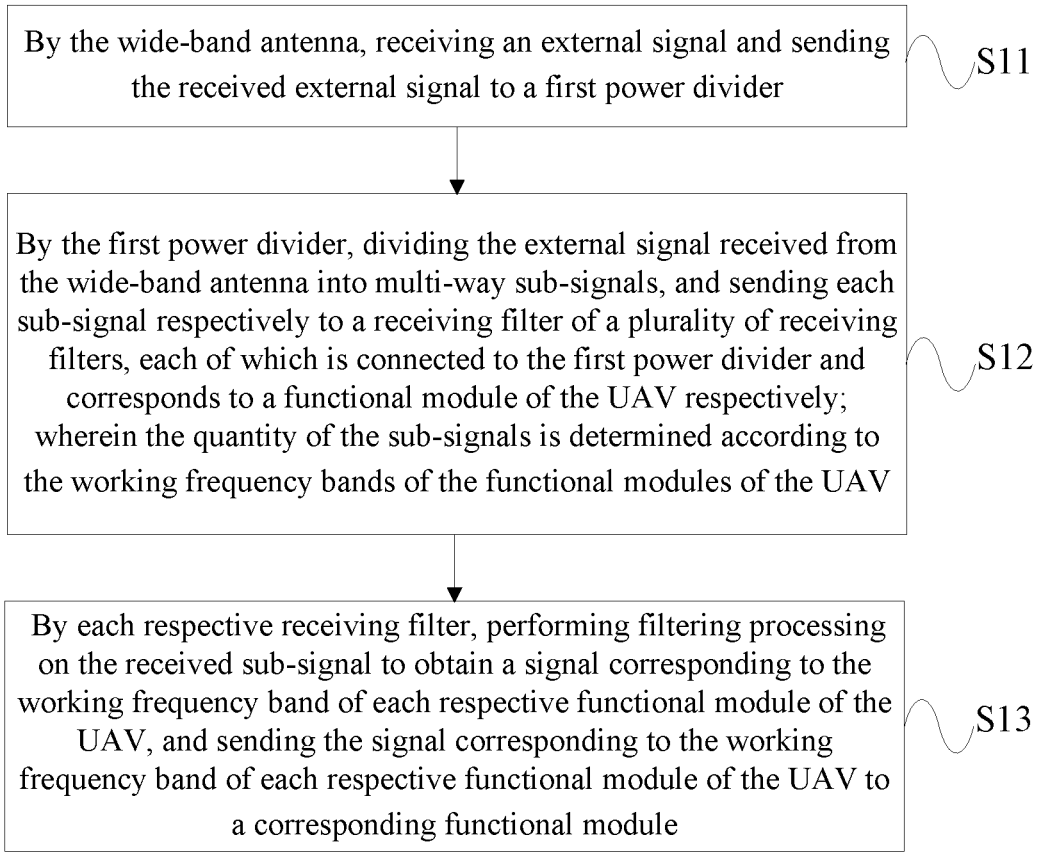
FIG. 1 is a schematic flowchart of an antenna multiplexing method of a UAV according to an embodiment of the present disclosure.

FIG. 1 is a schematic flowchart of an antenna multiplexing method of a UAV according to an embodiment of the present disclosure. As shown in FIG. 1, the method of the embodiment of the present disclosure comprises:

S11: by the wide-band antenna, receiving an external signal and sending the received external signal to a first power divider.

It should be noted that the UAV of the embodiment of the present disclosure is provided with a wide-band antenna. The working frequency band of the wide-band antenna is set according to the working frequency bands of the functional modules on the UAV, and covers the working frequency band of each respective functional module of the UAV. The wide-band antenna is used to receive external signals, and the external signals include signals in various frequency bands.

S12: by the first power divider, dividing the external signal received from the wide-band antenna into multi-way sub-signals, and sending each sub-signal respectively to a receiving filter of a plurality of receiving filters, each of which is connected to the first power divider and corresponds to a functional module of the UAV respectively. Wherein the quantity of the sub-signals is determined according to the working frequency bands of the functional modules of the UAV It should be noted that, when the first power divider divides one external signal energy into two or more signal energy and outputs, in other words, when an external signal is divided into multi-way sub-signals, each sub-signal includes signals in various frequency bands. The first power divider sends each respective sub-signal to each respective receiving filter respectively.

The quantity of sub-signals is determined according to the working frequency bands of the functional modules of the UAV. For example, when the UAV comprises two functional modules and the two functional modules have two different working frequency bands, the external signal is divided into two sub-signals.

S13: by each respective receiving filter, performing filtering processing on the received sub-signal to obtain a signal corresponding to the working frequency band of each respective functional module of the UAV, and sends the signal corresponding to the working frequency band of each respective functional module of the UAV to a corresponding functional module.

It should be noted that, in the embodiment of the present disclosure, when each respective receiving filter connected to the first power divider performs filtering processing on the received sub-signal after receiving the sub-signal, only the sub-signal in a specified frequency band is allowed to pass through, and the sub-signals in other frequency bands are filtered out to obtain a signal corresponding to the working frequency band of each respective functional module of the UAV, and then the signal corresponding to the working frequency band of each respective functional module of the UAV is sent to the corresponding functional module.

In the wide-band antenna multiplexing method of a UAV according to the embodiment of the present disclosure, a wide-band antenna is provided on the UAV, all external signals are received through the wide-band antenna, the first power divider divides the received external signal into multi-way sub-signals and sends each respective sub-signal respectively to each respective receiving filter corresponding to each respective functional module on the UAV, each respective receiving filter performs filtering processing on the received sub-signal to obtain a signal corresponding to the working frequency band of each respective functional module of the UAV, and the signal is sent to the corresponding functional module and is used by each respective functional module. Unlike the prior art, the present disclosure uses a wide-band antenna in place of the conventional multiple antennas to receive all external signals, and sends various signals needed by the UAV to corresponding functional modules through the processing of the first power divider and a plurality of receiving filters, which greatly reduces the weight of the UAV and improves the flight endurance of the UAV.

In an embodiment of the present disclosure, the external signal includes a GPS satellite signal and a flight control signal.

The step of by the first power divider, dividing the external signal received from the wide-band antenna into multi-way sub-signals comprises:

by the first power divider, dividing the external signal received from the wide-band antenna into a first-way sub-signal and a second-way sub-signal.

The step of by each respective receiving filter, performing filtering processing on the received sub-signal, obtaining a signal corresponding to the working frequency band of each respective functional module of the UAV, and sending the signal corresponding to the working frequency band of each respective functional module of the UAV to a corresponding functional module comprises:

by a first GPS filter, performing filtering processing on the first-way sub-signal, acquires a GPS satellite signal corresponding to a first frequency band from the first-way sub-signal, and sends the acquired GPS satellite signal to a localization module of the UAV; and by a flight control filter, performing filtering processing on the second-way sub-signal, acquires a flight control signal corresponding to a second frequency band from the second-way sub-signal, and sends the acquired flight control signal to a remote control receiving module of the UAV.

In practical applications, the working frequency band of the localization module of the UAV is 1.57 GHz, and the working frequency band of the remote control receiving module of the UAV is 2.4 GHz.

Herein, the first GPS filter is configured to obtain a signal corresponding to the working frequency band of a localization module. In a specific implementation, in order to obtain the GPS satellite signal, the first GPS filter performs filtering processing on the first-way sub-signal and filters out signals other than the GPS satellite signal. For example, when the received external signal includes a 1.57 GHz GPS satellite signal and a 2.4 GHz flight control signal, the first GPS filter allows the 1.57 GHz GPS satellite signal to pass and filters out the 2.4 GHz flight control signal, and sends the 1.57 GHz GPS satellite signal to the localization module of the UAV.

The flight control filter is configured to obtain a signal corresponding to the working frequency band of a remote control receiving module. In a specific implementation, in order to obtain a flight control signal, the flight control filter performs filtering processing on the second-way sub-signal and filters out signals other than the flight control signal. For example, when the received external signal includes a 1.57 GHz GPS satellite signal and a 2.4 GHz flight control signal, the flight control filter allows the 2.4 GHz flight control signal to pass and filters out the 1.57 GHz GPS satellite signal, and sends the 2.4 GHz flight control signal to the remote control receiver module of the UAV In order to improve the localization accuracy of the UAV, the localization module of the UAV is a differential GPS module, and corrects GPS satellite signals by using the received GPS ground base station satellite signals.

Optionally, in the embodiment of the present disclosure, the external signal received by the wide-band antenna also includes a GPS ground base station satellite signal. The step of by the first power divider, dividing the external signal received from the wide-band antenna into multi-way sub-signals comprises:

by the first power divider, dividing the external signal received from the wide-band antenna into a first-way sub-signal, a second-way sub-signal and a third-way sub-signal.

The step of by each respective receiving filter, performing filtering processing on the received sub-signal, obtaining a signal corresponding to the working frequency band of each respective functional module of the UAV, and sending the signal corresponding to the working frequency band of each respective functional module of the UAV to a corresponding functional module further comprises:

by the base station signal filter, performing filtering processing on the third-way sub-signal, acquires a GPS ground base station satellite signal corresponding to the second frequency band from the third-way sub-signal, and sends the acquired GPS ground base station satellite signal to the localization module of the UAV.

The communication between the remote controller of the UAV and the remote control receiving module adopts time domain frequency hopping technology, and the working frequency band in which the localization module of the UAV receives the GPS ground base station satellite signal is the same as that of the remote control receiving module (both are 2.4 GHz). Thus, in order to ensure the normal reception of the GPS ground base station satellite signal and the flight control signal, the passband of the flight control filter should be partially overlapped with the passband of the base station signal filter.

In a specific implementation, the communication between the remote controller and the remote control receiving module of the UAV adopts time domain frequency hopping technology and occupies different channels in the frequency band at different times. If the 2.4 GHz frequency band (2.4 GHz-2.5 GHz) is all allocated to the remote control receiving module, it will occupy all the channels in 2.4 GHz-2.5 GHz. However, the frequency band in which the localization module receives the GPS ground base station satellite signals is also the 2.4 GHz frequency band. Therefore, in the embodiment of the present disclosure, some channels in the 2.4 GHz frequency band are allocated to the remote control receiving module, and the channels are allocated so that the passband of the flight control filter is partially overlapped with the passband of the base station signal filter. For example, the 2.4 GHz-2.45 GHz channels are allocated to the remote control receiver module; the flight control filter uses a French 2.4 GHz filter whose passband is 2.4 GHz-2.45 GHz; the base station signal filter uses a common 2.4 GHz filter whose passband is 2.45-2.5 GHz.

In practical applications, the remote controller and the remote control receiver module of the UAV adopt frequency hopping technology, and they establish an agreement on a random change code. Only the remote control receiver module can obtain the flight control signal by analyzing the random change code, but the localization module cannot analyze the random change code to obtain the flight control signal and can only obtain the GPS ground base station satellite signal.

Optionally, after the first GPS filter performs filtering processing on the first-way sub-signal, the method further comprises:

by a GPS low-noise amplifier connected to the first GPS filter, processing the GPS satellite signal to obtain an amplified GPS satellite signal;

by a second power divider, processing the amplified GPS satellite signal to obtain two GPS satellite sub-signals, wherein one of the two GPS satellite sub-signals is sent to an attitude sensor of the UAV through a second GPS filter, and the other of the two GPS satellite sub-signals is sent to the localization module of the UAV through a third GPS filter.

It should be noted that in order to ensure the quality of the GPS satellite signals sent to the localization module and the attitude sensor of the UAV, the first GPS filter is connected to the GPS low-noise amplifier, and the GPS satellite signals are processed by the GPS low-noise amplifier.

It can be understood that, when the attitude sensor of the UAV receives the GPS satellite signal, it can determine the attitude of the UAV more accurately based on the GPS satellite signal.

Optionally, the method further comprises:

by the first power divider receives, receiving UAV operation state data sent by at least one functional module of the UAV from a sending filter; and sending the UAV operation state data through the wide-band antenna.

It can be understood that, in the embodiment of the present disclosure, optionally, the operation state data of the UAV collected by the functional module of the UAV can be received by a sending filter, the sending filter sends the received operation state data to the first power divider, and a power divider sends the operation state data to the outside through a wide-band antenna.

Specifically, the UAV operation state data includes UAV flight data and image data collected by the UAV.

The step of receiving UAV operation state data sent by at least one functional module of the UAV from a sending filter by the first power divider comprises:

by a first operation state filter, receiving the UAV flight data sent by the flight data module of the UAV; and by a second operation state filter, receiving the image data collected by the UAV and sent by an image data module of the UAV;

wherein the UAV flight data and the image data are sent in a time-domain multiplexing way respectively to the first operation state filter and the second operation state filter under the control of a controller of the UAV;

by an operation state combiner, combining the UAV flight data and the image data collected by the UAV to generate UAV operation state data;

by the sending filter, receiving the UAV operation state data processed by a UAV operation state data power amplifier; and by the first power divider, receiving the UAV operation state data from the sending filter.

In practical applications, the working frequency bands of the flight data module and the image data module are both 5.8 GHz. To avoid the distortion of UAV operation state data, the flight data module and image data module of the controller of the UAV send the respective acquired data in a time-domain multiplexing way to the first operation state filter and the second operation state filter, respectively. For example, the amount of UAV flight data is relatively small, and the amount of the image data collected by the UAV is relatively large, so UAV flight data can be sent within 50 ms of a second, and the image data collected by the UAV can be sent in the remaining 950 ms of a second.

It should be noted that the existing UAVs are generally provided with six antennas, namely, a first GPS antenna with a working frequency band of 1.57 GHz, for receiving GPS satellite signals and sending the received GPS satellite signals to the localization module of the UAV; a second GPS antenna with a working frequency band of 1.57 GHz, for receiving GPS satellite signals and sending the received GPS satellite signals to the attitude sensor of the UAV; a remote control receiving antenna with a working frequency band of 2.4 GHz, for receiving the flight control signal sent from the remote controller and sending the received flight control signal to the remote control receiving module; a data transmission antenna with a working frequency band of 2.4 GHz, for receiving the GPS ground base station satellite signal and sending the received GPS ground base station satellite signal to the localization module; a data transmission antenna with a working frequency band of 5.8 GHz, for receiving the UAV flight data and sending the received UAV flight data to the ground station; and an image transmission antenna with a working frequency band of 5.8 GHz, for receiving the image data collected by the UAV and sending the received image data to the ground station.

The six antennas installed on the UAV increase the weight of the UAV and reduce the flight endurance of the UAV. Therefore, in the embodiment of the present disclosure, a wide-band antenna is used in place of the six antennas to send various signals needed by the UAV to corresponding functional modules through the processing of the power divider and filters, and send the data collected by the UAV to the ground station, which greatly reduces the weight of the UAV and improves the flight endurance of the UAV.

Among the six antennas of the existing UAVs, the minimum working frequency band is 1.57 GHz and the maximum working frequency band is 5.8 GHz. Therefore, in practical applications, the working frequency band of the wide-band antenna is 1 GHz to 6 GHz to ensure that the working frequency band of the wide-band antenna can cover all working frequency bands. The direction of the wide-band antenna is omni-directional to ensure that external signals can be received in all directions. In addition, the impedance of the wide-band antenna is 50 ohms, and the return loss (RL) in the whole working frequency band is less than −8 dB.

Figure 2:
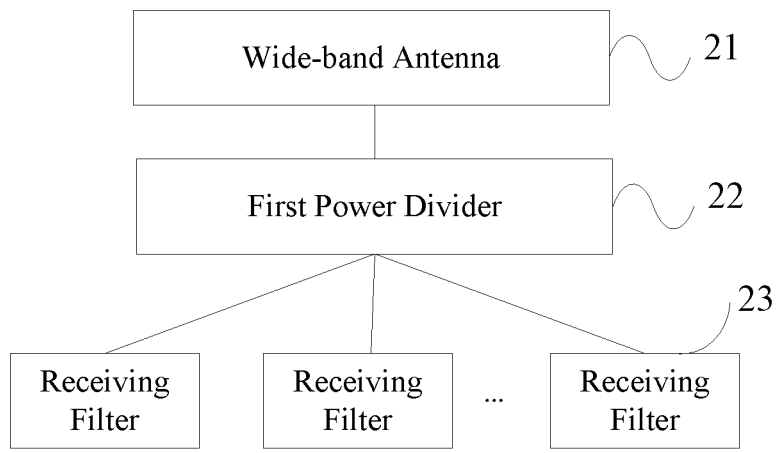
FIG. 2 is a schematic structural diagram of an antenna multiplexing device of a UAV according to an embodiment of the present disclosure.

FIG. 2 is a schematic structural diagram of an antenna multiplexing device of a UAV according to an embodiment of the present disclosure. As shown in FIG. 2, the device according to the embodiment of the present disclosure comprises: a wide-band antenna 21, a first power divider 22 and a plurality of receiving filters 23.

The wide-band antenna 21 is configured to receive an external signal, and send the received external signal to the first power divider 22.

The first power divider 22 is configured to divide the external signal received from the wide-band antenna 21 into multi-way sub-signals, and send each sub-signal respectively to a receiving filter of a plurality of receiving filters 23, each of which is connected to the first power divider 22 and corresponds to a functional module of the UAV respectively, wherein the quantity of the sub-signals is determined according to the working frequency bands of the functional modules of the UAV Each respective receiving filter 23 is configured to perform filtering processing on the received sub-signal, obtain a signal corresponding to the working frequency band of each respective functional module of the UAV, and send the signal corresponding to the working frequency band of each respective functional module of the UAV to a corresponding functional module.

In the antenna multiplexing device of a UAV according to the embodiment of the present disclosure, a wide-band antenna is provided on the UAV, all external signals are received through the wide-band antenna, the first power divider divides the received external signal into multi-way sub-signals and sends each respective sub-signal respectively to each respective receiving filter corresponding to each respective functional module on the UAV, each respective receiving filter performs filtering processing on the received sub-signal to obtain a signal corresponding to the working frequency band of each respective functional module of the UAV, and the signal is sent to the corresponding functional module and is used by each respective functional module. Unlike the prior art, the present disclosure uses a wide-band antenna in place of the conventional multiple antennas to receive all external signals, and sends various signals needed by the UAV to corresponding functional modules through the processing of the first power divider and a plurality of receiving filters, which greatly reduces the weight of the UAV and improves the flight endurance of the UAV.

Figure 3:
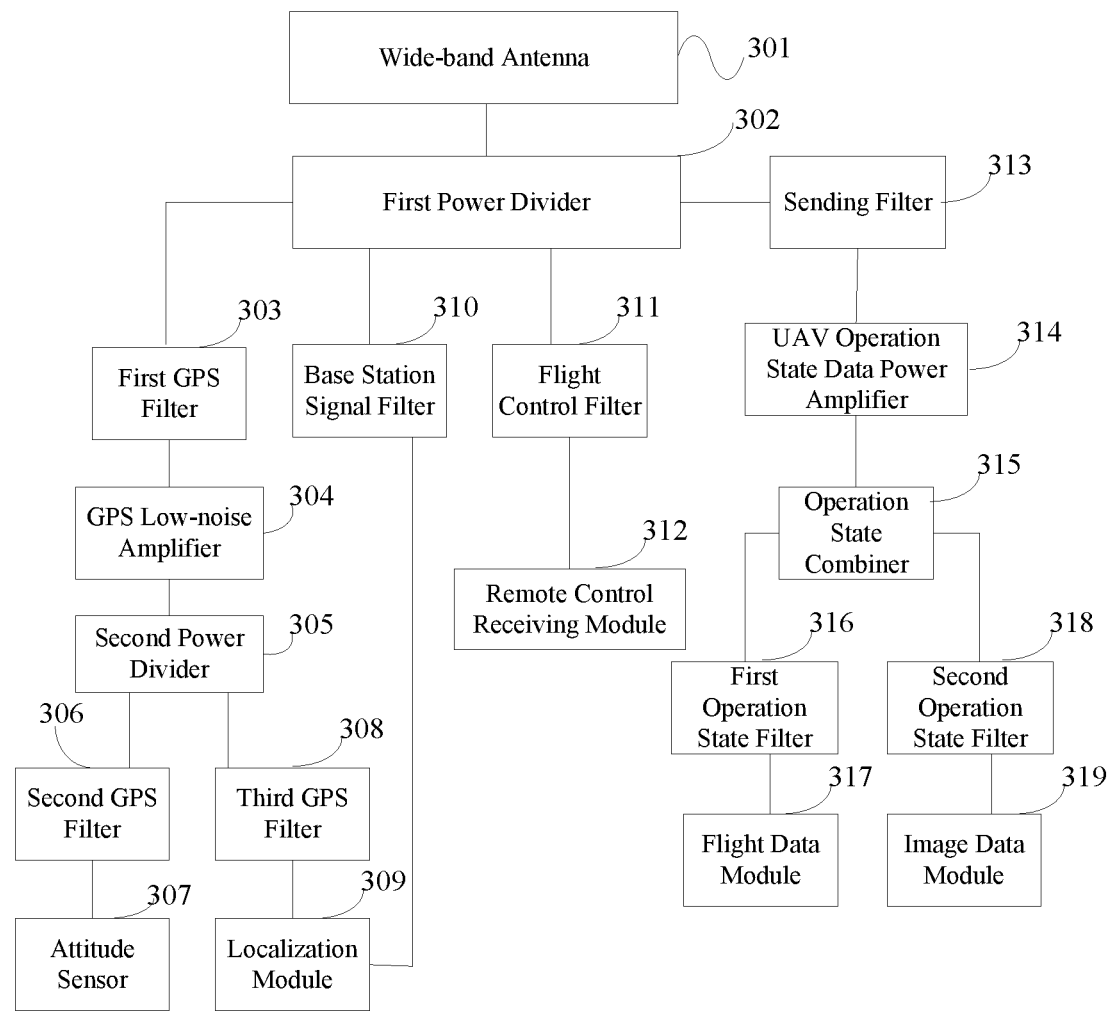
FIG. 3 is a schematic structural diagram of an antenna multiplexing device of a UAV according to another embodiment of the present disclosure.

In an embodiment of the present disclosure, as shown in FIG. 3, the UAV antenna multiplexing device comprises a wide-band antenna 301, a first power divider 302, and a plurality of receiving filters. The plurality of receiving filters comprise a first GPS filter 303 and a flight control filter 311.

The first power divider 302 is specifically configured to divide the external signal received from the wide-band antenna 301 into a first-way sub-signal and a second-way sub-signal.

The first GPS filter 303 performs filtering processing on the first-way sub-signal, acquires a GPS satellite signal corresponding to a first frequency band from the first-way sub-signal, and sends the acquired GPS satellite signal to a localization module 309 of the UAV.

The flight control filter 311 is configured to perform filtering processing on the second-way sub-signal, obtain a flight control signal corresponding to a second frequency band from the second-way sub-signal, and send the acquired flight control signal to a remote control receiving module 312 of the UAV.

In practical applications, the first-way sub-signal and the second-way sub-signal both include a 1.57 GHz GPS satellite signal and a 2.4 GHz flight control signal. The first GPS filter 303 has a passband of 1.57 GHz, so that in the first-way sub-signal, the 1.57 GHz GPS satellite signal passes through and the 2.4 GHz flight control signal is filtered out. The 1.57 GHz GPS satellite signal is sent to the localization module 309 of the UAV. The flight control filter 311 has a passband of 2.4 GHz, so that in the second-way sub-signal, the 2.4 GHz flight control signal passes through and the 1.57 GHz GPS satellite signal is filtered out. The 2.4 GHz flight control signal is sent to the remote control receiving module 312 of the UAV.

In order to ensure that weak GPS satellite signals are not affected, the insertion loss of the first GPS filter 303 is less than 1 dB.

Optionally, the plurality of receiving filters further comprises a base station signal filter 310.

The first power divider 302 is further configured to divide the external signal received from the wide-band antenna 301 into a first-way sub-signal, a second-way sub-signal, and a third-way sub-signal.

The base station signal filter 310 is further configured to perform filtering processing on the third-way sub-signal, acquire a GPS ground base station satellite signal corresponding to the second frequency band from the third-way sub-signal, and send the acquired GPS ground base station satellite signal to the localization module 309 of the UAV.

In practical applications, the first-way sub-signal, the second-way sub-signal, and the third-way sub-signal all include a 1.57 GHz GPS satellite signal, a 2.4 GHz flight control signal, and a 2.4 GHz GPS ground base station satellite signal.

The communication between the remote controller and the remote control receiving module of the UAV adopts time domain frequency hopping technology and occupies different channels in the frequency band at different time. If the 2.4 GHz frequency band (2.4 GHz-2.5 GHz) is all allocated to the remote control receiving module, it will occupy all the channels in 2.4 GHz-2.5 GHz. However, the frequency band of the GPS ground base station satellite signals is also in the 2.4 GHz frequency band. Therefore, in the embodiment of the present disclosure, the passband of the flight control filter 311 is partially overlapped with the passband of the base station signal filter 310; the flight control filter 311 uses a French 2.4 GHz filter whose passband is 2.4 GHz-2.45 GHz; and the base station signal filter 310 uses a common 2.4 GHz filter whose passband is 2.45-2.5 GHz.

Optionally, the device further comprises: a GPS low-noise amplifier 304, a second power divider 305, a second GPS filter 306 and a third GPS filter 308.

The GPS low-noise amplifier 304 is connected to the first GPS filter 303 for processing the GPS satellite signal to obtain an amplified GPS satellite signal.

The second power divider 305 is configured to process the amplified GPS satellite signal to obtain two GPS satellite sub-signals.

The second GPS filter 306 is configured to perform filtering processing on one of the two GPS satellite sub-signals, and send the filtered GPS satellite sub-signal to an attitude sensor 307 of the UAV.

The third GPS filter 308 is configured to perform filtering processing on the other of the two GPS satellite sub-signals, and send the filtered GPS sub-signal to the localization module 309 of the UAV.

It should be noted that the GPS low-noise amplifier 304 is configured to amplify the weak GPS satellite signal sent by the first GPS filter 303. Since the second GPS filter 306 and the third GPS filter 308 receive GPS satellite signals after being amplified, there is no limitation on the insertion loss of the second GPS filter 306 and the third GPS filter 308. The second GPS filter 306 and the third GPS filter 308 are required to have a suppression degree of more than 40 dB with respect to signals other than a signal of 1.57 GHz (in particular, signals of 2.4 GHz and 5.8 GHz).

Optionally, the device further comprises: a first operation state filter 316, a second operation state filter 318, an operation state combiner 315, a UAV operation state data power amplifier 314 and a sending filter 313.

The first operation state filter 316 is configured to receive UAV flight data sent by a flight data module 317 of the UAV.

The second operation state filter 318 receives image data collected by the UAV sent by an image date module 319 of the UAV.

The UAV flight data and the image data are sent in a time-domain multiplexing way to the first operation state filter 316 and the second operation state filter 318 respectively under the control of a controller of the UAV.

The operational state combiner 315 combines the UAV flight data and the image data collected by the UAV to generate the UAV operation state data.

The sending filter 313 is configured to receive the UAV operation state data processed by the UAV operation state data power amplifier 314.

The first power divider 302 is also configured to receive the UAV operation state data from the sending filter 313.

In practical applications, the working frequency bands of the flight data module 317 and the image data module 319 are both 5.8 GHz. To avoid the distortion of UAV operation state data, the flight data module 317 and image data module 319 of the controller of the UAV send the respective acquired data in a time-domain multiplexing way to the first operation state filter 316 and the second operation state filter 318, respectively. For example, the amount of UAV flight data is relatively small, and the amount of image data collected by the UAV is relatively large, so UAV flight data can be sent within 50 ms of a second, and the image data collected by the UAV can be sent in the remaining 950 ms of a second.

In practical applications, the gain of the UAV operation state data power amplifier 314 is greater than 10 dB. There is no limitation on insertion loss of the first operation state filter 316, the second operation state filter 318 and the sending filter 313, and a suppression degree of more than 40 dB with respect to signals other than a signal of 5.8 GHz (in particular, signals of 1.57 GHz and 2.4 GHz) is required.

In sum, according to the technical solutions of the present disclosure, a wide-band antenna is provided on the UAV, all external signals are received through the wide-band antenna, the first power divider divides the received external signal into multi-way sub-signals and sends each respective sub-signal respectively to each respective receiving filter corresponding to each respective functional module on the UAV, each respective receiving filter performs filtering processing on the received sub-signal to obtain a signal corresponding to the working frequency band of each respective functional module of the UAV, and the signal is sent to the corresponding functional module and is used by each respective functional module. Unlike the prior art, the present disclosure uses a wide-band antenna to replace the conventional multiple antennas to receive all external signals, and sends various signals needed by the UAV to corresponding functional modules through the processing of the first power divider and a plurality of receiving filters, which greatly reduces the weight of the UAV and improves the flight endurance of the UAV.

A person skilled in the art should understand that the embodiments of the present disclosure may be provided as a method, a system, or a computer program product. Thus, the present disclosure may take the form of an entirely hardware embodiment, an entirely software embodiment, or an embodiment combining software and hardware. Furthermore, the present disclosure may take the form of a computer program product embodied on one or more computer-usable storage media (including, but not limited to, disk storage, CD-ROMs, optical memories, etc.) having computer-usable program code recorded thereon.

The present disclosure is described with reference to flowcharts and/or block diagrams of the method, the device (system), and the computer program product according to the embodiment of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing device to generate a machine so that a device for implementing the functions specified in one or more blocks of a flowchart or multiple flows and/or block diagrams of a flowchart can be generated by instructions executed by a processor of a computer or other programmable data processing device.

It should be noted that the terms "comprise", "include" or any other variations thereof are non-exclusive or open-ended, so that a process, method, article, or device including a series of elements includes not only those elements listed, but also comprises other elements which are not listed, or the elements that are inherent to such a process, method, article, or device. In the case that there is no more limitation, an element defined by the wording "comprising a" does not exclude the additional same element in the process, method, article or device that comprises the element.

In the description of the present disclosure, many specific details are illustrated. However, it can be understood that the embodiments of the present disclosure may be implemented without those specific details. In some instances, well-known methods, structures and techniques are not shown in detail in order not to obscure the understanding of this description. Similarly, it should be understood that in order to simplify the disclosure of the present disclosure and help understand one or more of the various inventive aspects, in the above description of exemplary embodiments of the present disclosure, various features of the present disclosure are sometimes grouped together in a single embodiment, figure, or description thereof. However, the disclosed method should not be interpreted as reflecting an intention that the claimed present disclosure requires more features than those expressly recited in each claim. More exactly, as the claims reflect, inventive aspects include features less than all the features of a single foregoing disclosed embodiment. Thus, the claims following the detailed description are hereby expressly incorporated into this detailed description, with each claim being an independent embodiment of the present disclosure.

The description above is merely specific embodiments of the present disclosure. With the foregoing teachings of the present disclosure, a person skilled in the art may make other improvements or modifications based on the foregoing embodiments. A person skilled in the art should understand that the specific description above is only for better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A wide-band antenna multiplexing method of an unmanned aerial vehicle (UAV), wherein the UAV is provided with a wide-band antenna, a working frequency band of the wide-band antenna is set according to working frequency bands of functional modules on the UAV to cover a working frequency band of each respective functional module of the UAV, and the method comprises:
    by the wide-band antenna, receiving an external signal and sending the received external signal to a first power divider;
    by the first power divider, dividing the external signal received from the wide-band antenna into a plurality of sub-signals, and sending the sub-signals respectively to a plurality of receiving filters which are connected to the first power divider and are corresponding to a plurality of functional modules on the UAV respectively, wherein the quantity of the sub-signals is determined according to the working frequency bands of the functional modules of the UAV; and
    by each respective receiving filter, performing filtering with respect to the received sub-signal, obtaining a signal corresponding to the working frequency band of each respective functional module of the UAV, and sending the signal corresponding to the working frequency band of each respective functional module of the UAV to a corresponding functional module.

2. The method according to claim 1, wherein the external signal includes a GPS satellite signal and a flight control signal;
    the step of by the first power divider, dividing the external signal received from the wide-band antenna into a plurality of sub-signals comprises:
    by the first power divider, dividing the external signal received from the wide-band antenna into a first sub-signal and a second sub-signal;
    the step of by each respective receiving filter, performing filtering with respect to the received sub-signal, obtaining a signal corresponding to the working frequency band of each respective functional module of the UAV, and sending the signal corresponding to the working frequency band of each respective functional module of the UAV to a corresponding functional module comprises:
    by a first GPS filter, performing filtering with respect to the first sub-signal, acquiring a GPS satellite signal corresponding to a first frequency band from the first sub-signal, and sending the acquired GPS satellite signal to a positioning module of the UAV; and
    by a flight control filter, performing filtering processing with respect to the second sub-signal, acquiring a flight control signal corresponding to a second frequency band from the second sub-signal, and sending the acquired flight control signal to a remote control receiver module of the UAV.

3. The method according to claim 2, wherein the external signal further includes a GPS terrestrial base station satellite signal;
the step of by the first power divider, dividing the external signal received from the wide-band antenna into a plurality of sub-signals comprises:
by the first power divider, dividing the external signal received from the wide-band antenna into a first sub-signal, a second sub-signal, and a third sub-signal;
the step of by each respective receiving filter, performing filtering with respect to the received sub-signal, obtaining a signal corresponding to the working frequency band of each respective functional module of the UAV, and sending the signal corresponding to the working frequency band of each respective functional module of the UAV to a corresponding functional module further comprises:
by a base station signal filter, performing filtering with respect to the third sub-signal, acquiring a GPS terrestrial base station satellite signal corresponding to the second frequency band from the third sub-signal, and sending the acquired GPS terrestrial base station satellite signal to the positioning module of the UAV.

4. The method according to claim 3, wherein a passband of the flight control filter is partially overlapped with a passband of the base station signal filter.

5. The method according to claim 3, wherein after the first GPS filter performs filtering with respect to the first sub-signal, the method further comprises:
by a GPS low-noise amplifier connected to the first GPS filter, processing the GPS satellite signal to obtain an amplified GPS satellite signal;
by a second power divider, processing the amplified GPS satellite signal to obtain two GPS satellite sub-signals, wherein one of the two GPS satellite sub-signals is sent to an attitude sensor of the UAV through a second GPS filter, and the other GPS satellite signal is sent to the positioning module of the UAV through a third GPS filter.

6. The method according to claim 1, further comprising:
by the first power divider, receiving UAV operation state data sent by at least one functional module of the UAV from a sending filter; and
sending the UAV operation state data through the wide-band antenna.

7. The method according to claim 6, wherein the UAV operation state data includes UAV flight data and image data collected by the UAV; and
the step of by the first power divider, receiving UAV operation state data sent by at least one functional module of the UAV from a sending filter comprises:
by a first operation state filter, receiving the UAV flight data sent by a flight data module of the UAV; and
by a second operation state filter, receiving the image data collected by the UAV and sent by an image data module of the UAV;
wherein the UAV flight data and the image data are sent in a time-domain multiplexing way respectively to the first operation state filter and the second operation state filter under the control of a controller of the UAV;
by an operation state combiner, combining the UAV flight data and the image data collected by the UAV to generate the UAV operation state data;
by the sending filter, receiving UAV operation state data processed by a UAV operation state data power amplifier; and
by the first power divider, receiving the UAV operation state data from the sending filter.

8. A wide-band antenna multiplexing device of an unmanned aerial vehicle (UAV), comprising: a wide-band antenna, a first power divider and a plurality of receiving filters; a working frequency band of the wide-band antenna is set according to working frequency bands of functional modules on the UAV to cover a working frequency band of each respective functional module of the UAV;
the wide-band antenna is configured to receive an external signal and send the received external signal to the first power divider;
the first power divider is configured to divide the external signal received from the wide-band antenna into a plurality of sub-signals, and send the sub-signals respectively to the plurality of receiving filters which are connected to the first power divider and are corresponding to a plurality of functional modules on the UAV respectively, wherein the quantity of the sub-signals is determined according to the working frequency bands of the functional modules of the UAV; and
each respective receiving filter is configured to perform filtering with respect to the received sub-signal, obtain a signal corresponding to the working frequency band of each respective functional module of the UAV, and send the signal corresponding to the working frequency band of each respective functional module of the UAV to a corresponding functional module.

9. The device according to claim 8, wherein the plurality of receiving filters comprises a first GPS filter and a flight control filter;
the first power divider is specifically configured to divide the external signal received from the wide-band antenna into a first sub-signal and a second sub-signal;
the first GPS filter is configured to perform filtering with respect to the first sub-signal, acquire a GPS satellite signal corresponding to a first frequency band from the first sub-signal, and send the acquired GPS satellite signal to a positioning module of the UAV; and
the flight control filter is configured to perform filtering processing with respect to the second sub-signal, obtain a flight control signal corresponding to a second frequency band from the second sub-signal, and send the acquired flight control signal to a remote control receiver module of the UAV.

10. The device according to claim 9, further comprising: a GPS low-noise amplifier, a second power divider, a second GPS filter and a third GPS filter;
the GPS low-noise amplifier is connected to the first GPS filter and is configured to process the GPS satellite signal to obtain an amplified GPS satellite signal;
the second power divider is configured to process the amplified GPS satellite signal to obtain two GPS satellite sub-signals;
the second GPS filter is configured to perform filtering with respect to one of the two GPS satellite sub-signals, and send the filtered GPS satellite sub-signal to an attitude sensor of the UAV; and
the third GPS filter is configured to perform filtering with respect to the other of the two GPS satellite sub-signals, and send the filtered GPS satellite sub-signal to the positioning module of the UAV.

11. The device according to claim 9, wherein the plurality of receiving filters further comprises a base station signal filter;

the first power divider is configured to divide the external signal received from the wide-band antenna into a first sub-signal, a second sub-signal and a third sub-signal; and the base station signal filter is configured to perform filtering with respect to the third sub-signal, acquire a GPS terrestrial base station satellite signal corresponding to the second frequency band from the third sub-signal, and send the acquired GPS terrestrial base station satellite signal to the positioning module of the UAV.

12. The device according to claim 11, wherein a passband of the flight control filter is partially overlapped with a passband of the base station signal filter.

13. The device according to claim 8, further comprising: a sending filter;

the sending filter is configured to send the received UAV operation state data sent by at least one functional module of the UAV to the first power divider; and the first power divider is further configured to send the UAV operation state data through the wide-band antenna.

14. The device according to claim 13, further comprising: a first operation state filter, a second operation state filter, an operation state combiner, and a UAV operation state data power amplifier;

the first operation state filter is configured to receive UAV flight data sent by a flight data module of the UAV; and the second operation state filter is configured to receive image data collected by the UAV and sent by an image data module of the UAV;

wherein the UAV flight data and image data are sent in a time-domain multiplexing way to the first operation state filter and the second operation state filter respectively under the control of a controller of the UAV;

the operation state combiner is configured to combine the UAV flight data and the image data collected by the UAV to generate the UAV operation state data; and the sending filter is configured to receive the UAV operation state data processed by the UAV operation state data power amplifier.

\* \* \* \* \*